No. 617,153. Patented Jan. 3, 1899.
J. GALPIN.
HORSE BOOT.
(Application filed July 20, 1897.)
(No Model.)
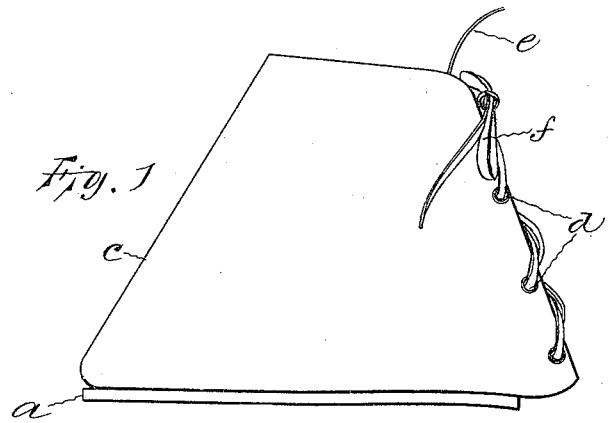
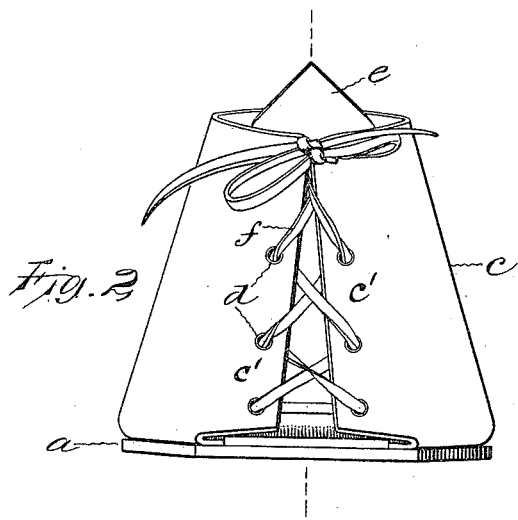
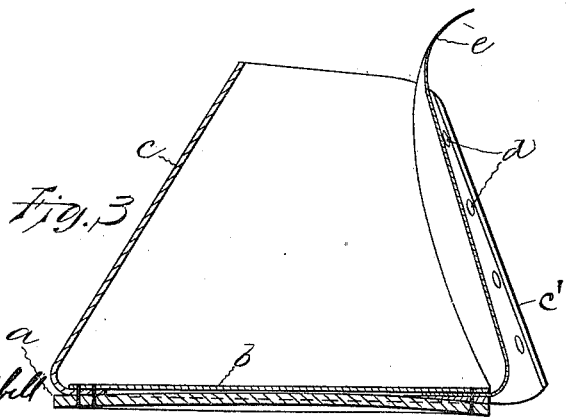
Witnesses
W. E. Campbell
C. E. Burchard
Inventor
John Galpin
By
W. E. Simond
Attorney
THE NORRIS PETERS CO., PHOTO-LITHO., WASHINGTON, D. C.

UNITED STATES PATENT OFFICE.

JOHN GALPIN, OF WINSTED, CONNECTICUT.

HORSE-BOOT.

SPECIFICATION forming part of Letters Patent No. 617,153, dated January 3, 1899.

Application filed July 20, 1897. Serial No. 645,258. (No model.)

*To all whom it may concern:*

Be it known that I, JOHN GALPIN, a citizen of the United States of America, residing at Winsted, in the county of Litchfield and State of Connecticut, have invented a certain new and useful Improvement in Horse-Boots, of which the following is a description, reference being had to the accompanying drawings, wherein—

Figure 1 is a side elevational view. Fig. 2 is a rear elevational view. Fig. 3 is a view in central vertical section from front to rear.

The object of the invention is denoted by its title. It is a boot for the foot of a horse to be used either in the treatment of the foot or worn upon the foot when the horse is used upon a lawn or for any other proper and cognate purpose.

The improvement consists in certain details of construction which render the boot light, strong, efficient, durable, adjustable, and withal very cheap of construction.

In the accompanying drawings the letter $a$ denotes the main sole of the boot.

The letter $b$ denotes the insole, which fills the bottom of the boot from side to side all around.

The letter $c$ denotes the upper, which is cleft at the rear from top to bottom, the edges of that cleft being provided with lacing-holes $d$. The lower edge of the upper $c$ extends inwardly between the insole and the main sole entirely around the peripheries of those two soles, and, except at the rear, these three parts are fastened together preferably by short nails driven in all around.

The shape of the parts is such that the boot accurately fits the horse's hoof, even passing on over a shoe, if one be worn. At the rear and beyond the line of nails the upper is formed into two flaps $c'$, which are pliable and free, as their lower edges are not attached to the soles, and these flaps carry the lacing-holes $d$, above mentioned. Hence provision is made for applying the boot to hoofs of various sizes, while always covering the fetlock with parts which are not rigid, but will yield readily to permit the usual movements of the hoof.

The letter $e$ denotes a pliable tongue fastened to the insole at the rear and closing the cleft of the upper and upon the inside of the flaps.

The letter $f$ denotes a lacing arranged in the lacing-holes, by means of which the upper can be adjusted to and laced upon the horse's foot or hoof with any desired degree of pressure.

This construction of a horse's boot, hereinbefore described, results in the production of a boot which is very light, very strong, very efficient, very durable, capable of being adjusted to the horse's foot with great nicety, capable of being made waterproof on the foot when poultices are applied thereto, and withal very cheap of construction.

I claim as my improvement—

The herein-described horse's boot, the same comprising a main sole, an insole, an upper secured at its lower edges between the peripheries of said soles on all sides except at the rear of the hoof and there cleft in two free pliable flaps provided with lacing-holes, a tongue secured to the soles and closing the cleft inside the edges of said flaps, and a lacing for removably and adjustably connecting said edges over the fetlock, all substantially as set forth.

JOHN GALPIN.

Witnesses:
ARBA K. ALFORD,
HENRY I. BRONSON.